Nov. 6, 1934.    M. HÉNAP    1,979,935
HYDRAULIC SPOKE WHEEL
Filed April 7, 1934
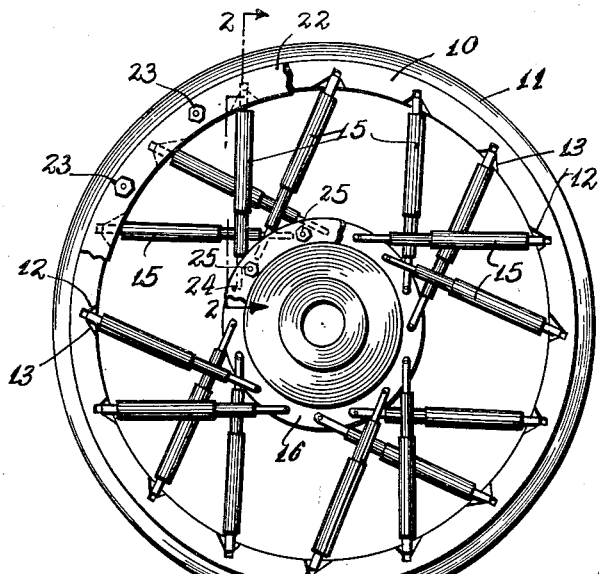
Fig. 1.
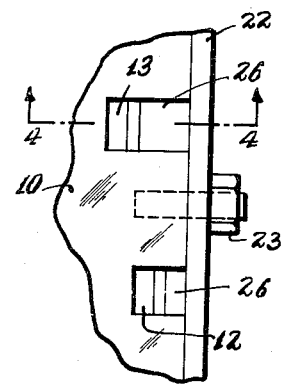
Fig. 3.
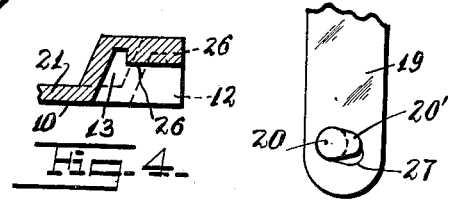
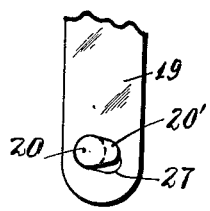
Fig. 4.   Fig. 5.
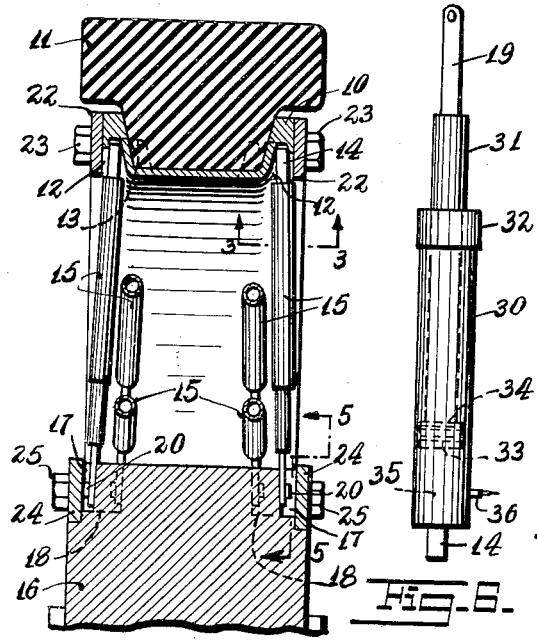
Fig. 2.
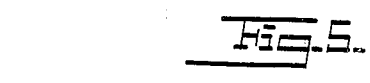
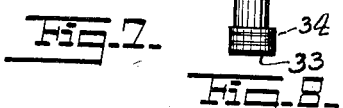
Fig. 7.   Fig. 8.
INVENTOR
MICHAEL HÉNAP
BY
ATTORNEY Patented Nov. 6, 1934

1,979,935

UNITED STATES PATENT OFFICE 1,979,935

HYDRAULIC SPOKE WHEEL

Michael Hénap, New York, N. Y.

Application April 7, 1934, Serial No. 719,444

3 Claims. (Cl. 152—47)

This invention relates to new and useful improvements in a hydraulic spoke wheel.

The invention has for an object the construction of an object as mentioned which is characterized by a felloe for a tire, a hub for the wheel, and a novel arrangement of hydraulic spokes between the felloe and hub for producing a wheel of great resiliency. With this arrangement it is possible to use a solid tire as distinguished from a pneumatic tire and obtain all the resilient qualities of the pneumatic tire.

More particularly, in further detail, an arrangement is proposed wherein each spoke has a stud at one of its ends engaging in a receiving recess in the felloe, and a stem at its other end mounted upon a fastening element in a recess in the hub.

Still further the invention proposes an arrangement whereby the hydraulic pressure within each spoke functions to maintain the spoke in position within the recesses of the felloe and hub.

Still further the invention also proposes an arrangement whereby flanges are attached upon the felloe and hub for further insuring the maintenance of the spokes in position.

Still further the invention also proposes an arrangement whereby the stems of the hydraulic spokes may be removed from the fastening elements only when the stems are turned slightly from their normal positions to permit disengagement over heads of the fastening elements.

Still further the invention proposes the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a wheel constructed according to this invention.

Fig. 2 is a fragmentary enlarged sectional view taken on the line 2—2 of Fig. 1.

Fig. 3 is a fragmentary elevational view of a portion of the felloe showing particularly a portion of the inner side thereof.

Fig. 4 is a fragmentary sectional view taken on the line 4—4 of Fig. 3.

Fig. 5 is an enlarged detailed view of a portion of Fig. 1 showing in particular in enlarged scale one of the ends of one of the stems of one of the hydraulic spokes.

Fig. 6 is a side elevational view of one of the hydraulic spokes, illustrated per se.

Fig. 7 is a side elevational view of one section of the spoke illustrated in Fig. 6.

Fig. 8 is a side elevational view of the other section of the spoke illustrated in Fig. 6.

The hydraulic spoke wheel according to this invention comprises a felloe 10 for a tire 11 on its outer side and having its inner side formed with a plurality of recesses 12 and 13 for receiving the stud ends 14 of hydraulic spokes 15. The felloe is associated with a hub 16 for the wheel having its outer side formed with a plurality of recesses 17 and 18 for receiving the stems 19 of the said hydraulic spokes 15.

Fastening elements 20 for the stems 19 are arranged within the recesses 17 and 18 in a manner so that the stems may be readily engaged and disengaged as desired. The hydraulic spokes 15 are arranged in similar groups around the circumference of the wheel and at angles to the radial lines of the wheel in such a manner so as to rigidly and firmly hold the felloe relative to the hub. More particularly the spokes 15 in each group have certain of them at the outside of the wheel relative to the others. This may be particularly seen by inspecting Figs. 1 and 2 and noting that in each group there are two spokes on the outside and two beneath said two. This arrangement is necessary in that then the spokes may cross each other and so brace the felloe properly against the hub.

The felloe 10 is formed with a peripheral circumferential recess 21 into which the tire 11 engages. This tire is a solid rubber tire. The felloe 10 is supported by the spokes 15 from the hub 16, and are arranged at both sides of the hub. The construction on both sides is identical. The felloe 10 has a ring 22 attached upon each side by a plurality of screws 23 which serve to close the sides of the recesses 12 and 13 for aiding in preventing the spokes from disengaging. It will readily be understood if for any reason the spokes lose some of their pressure and tend to contract they will be prevented from falling out by the flanges 22. Similarly the hub 16 is provided with flanges 24 attached in position with screws 25. These flanges also serve to hold the stem ends of the spokes from disengaging from the recess.

The recesses 12 and 13 distinguish from each other merely in the fact that the recesses 13 are extended inwards further from the sides of the felloe than the recesses 12 to accommodate those spokes arranged in the back as contrasted to those arranged in the front. Each of the recesses 12 and 13 have depending lips 26 towards the outer sides of the felloe for dividing off inner portions of the recesses into which the studs 14 engage. Similarly the recesses 17 and 18 in the hub distinguish from each other merely in the fact that the recesses 18 engage in further from the sides of the hub than the recesses 17 for accommodating those spokes in the back as contrasted with those in the front.

The stems 19 of the hydraulic spokes are formed with elongated openings 27 adapted to engage upon the fastening elements 20. Each fastening element 20 has an offset head portion 20' arranged so that the elongated opening 27 may engage thereover in one position of rotation of the stem. As illustrated in Fig. 5 the stem 19 is in its natural position in which the spoke is mounted in the wheel. In order to disengage the stem 19 from the fastening element 20 it is necessary that the stem be rotated slightly anti-clockwise so that the elongated opening 27 aligns with the head 20' of the fastening element, and then disengagement is possible. These fastening elements 20 are mounted upon the inner walls of the recesses 17 and 18.

Each of the spokes 15 comprises telescopic sections in the form of an outer section 30 and an inner section 31. The outer section 30 has the stud 14 projecting from one end. The inner section 31 extends from the outer section 30 and is equipped at its extended end with the stem 19. A packing gland 32 threadedly engages upon the inner end of the outer section 30 for hermetically connecting the sections to maintain a condition of pressure within the section 30 as desired. The inner section 31 is also equipped with a head 33 provided with several packing rings 34 so as to hermetically seal a compartment 35 existing between the end of the outer section 30 and the inner end of the inner section 31.

A one way valve 36 is mounted upon the outer section 30 for the purpose of passing oil and air into the compartment 35. Experience shows that in the operation of each of the hydraulic spokes a good combination is one in which the compartment 35 is ¾ filled with oil and ¼ with air. The oil is non-compressible while the air may be compressed. It has been found that with this particular ratio best results have been obtained. In addition the oil aids the telescopic action and furthermore aids in the hermetical sealing of the compartment 35.

The wheel may be placed in operative condition in the following manner: First let us assume that the flanges 22 and 23 are removed from the felloe 10 and the hub 16. The hydraulic spokes 15 are then engaged in place so that the studs 14 engage in the recesses 12 and 13 and the stems 19 are engaged upon the fastening elements 20. Of course it is necessary that the stems 19 be first engaged upon the fastening elements and then the hydraulic spokes swung into proper condition for the studs 14 to engage the recesses 12 and 13. The spokes may be temporarily filled with some liquid and air merely for the purpose of holding them in position. Finally the flanges 22 and 24 should be engaged in place. The spokes are now ready to be brought up to their proper conditions of pressure for producing the resiliency desired. This may be done by injecting oil and air through the valves 36. The pressure in each of the spokes may be read with a gage placed in succession on each valve 36, as is customary in reading the internal pressures of inner tubes of tires.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A hydraulic spoked wheel, comprising a felloe for a tire on the outer side thereof and having an inner side having recesses for receiving stud ends of hydraulic spokes, a hub for the wheel having an outer side having recesses for receiving stem ends of said hydraulic spokes, fastening elements for the stem ends in the recesses in the said hub, hydraulic spokes having studs on one of their ends engaging in the recesses of said felloe and stems on the other of their ends engaging on said fastening elements, and cooperative means on said fastening elements and stems for holding them joined in normal positions of the stems upon the wheel and laterally disconnectible by moving the stems free from the fastening elements in turned positions of the stems.

2. A hydraulic spoked wheel comprising a felloe for a tire on the outer side thereof and having an inner side having recesses for receiving stud ends of hydraulic spokes, a hub for the wheel having an outer side having recesses for receiving stem ends of said hydraulic spokes, fastening elements for the stem ends in the recesses in the said hub, and hydraulic spokes having studs on one of their ends engaging in the recesses of said felloe and stems on the other of their ends engaging on said fastening elements, certain of said spokes being laterally "inside" relative to other of said spokes to provide for the crossing of said spokes, and the said recesses being similarly arranged, that is, certain of the recesses being laterally "deeper" than other of the recesses for respectively receiving the ends of the inner and outer spokes.

3. A hydraulic spoked wheel, comprising a felloe for a tire on the outer side thereof and having an inner side having recesses for receiving stud ends of hydraulic spokes, a hub for the wheel having an outer side having recesses for receiving stem ends of said hydraulic spokes, fastening elements for the stem ends in the recesses in the said hub, and hydraulic spokes having studs on one of their ends engaging in the recesses of said felloe and stems on the other of their ends engaging on said fastening elements, said fastening elements having offset heads, and said stems having elongated openings engageable in certain positions of rotation over said heads, and in normal positions upon the wheel having said elongated openings out of register with said heads.

MICHAEL HÉNAP.